(12) United States Patent
Hascalovici et al.

(10) Patent No.: US 8,301,784 B2
(45) Date of Patent: Oct. 30, 2012

(54) TRANSCODING CONTENT FOR MAXIMIZING PLAYBACK ABILITIES IN A SWITCH ENABLED DEVICE

(75) Inventors: Ady Hascalovici, Sunnyvale, CA (US); Brian E. Hofstetter, Ben Lomond, CA (US)

(73) Assignee: CSR Technology Inc., San Jose, CA (US)

( * ) Notice: Subject to any disclaimer, the term of this patent is extended or adjusted under 35 U.S.C. 154(b) by 272 days.

(21) Appl. No.: 12/191,147

(22) Filed: Aug. 13, 2008

(65) Prior Publication Data
US 2010/0042747 A1 Feb. 18, 2010

Related U.S. Application Data

(60) Provisional application No. 61/018,929, filed on Jan. 4, 2008, provisional application No. 61/018,984, filed on Jan. 4, 2008, provisional application No. 61/019,184, filed on Jan. 4, 2008.

(51) Int. Cl.
*G06F 15/16* (2006.01)
(52) U.S. Cl. ......................................... 709/228; 709/223
(58) Field of Classification Search .................. 709/201, 709/247, 223, 228
See application file for complete search history.

(56) References Cited

U.S. PATENT DOCUMENTS

| | | | | |
|---|---|---|---|---|
| 6,490,627 B1 * | 12/2002 | Kalra et al. | .................... | 709/231 |
| 7,505,889 B2 * | 3/2009 | Salmonsen et al. | .............. | 703/23 |
| 7,506,355 B2 * | 3/2009 | Ludvig et al. | ................. | 725/112 |
| 7,594,033 B2 * | 9/2009 | Abjanic et al. | ................ | 709/246 |
| 7,721,111 B2 * | 5/2010 | Hug et al. | ...................... | 713/189 |

OTHER PUBLICATIONS

CEA: CE Industry Forecast—CE Industry Forecast, http://www.ce.org/Research/Sales_Stats/1891.asp, accessed Apr. 6, 2008, 2 pgs.

* cited by examiner

*Primary Examiner* — Emmanuel L Moise
*Assistant Examiner* — Marie Georges Henry
(74) *Attorney, Agent, or Firm* — Frommer Lawrence & Haug LLP; John W. Branch

(57) ABSTRACT

Embodiments are directed towards providing a switch proxy service (SPS) to transcode content from a native format into a format optimized for play at a switch enabled consumer electronic device (SED). In one embodiment, the SPS may receive a set of capabilities for a SED that includes at least a minimum, a maximum, and at least one other set of content characteristics. The SPS may associate the capability set with a device identifier that uniquely identifies the SED. When a request for content is received, the SPS examines the request to determine if it valid and authorized. If the request is valid and authorized, the SPS provides content transcoded based on the capability set for the SED, where the SPS provides the content as much as possible to satisfy the SED's best quality set of content characteristics, but at least within the SED's minimum/maximum sets of content characteristics.

21 Claims, 6 Drawing Sheets

TRANSCODING CONTENT FOR MAXIMIZING PLAYBACK ABILITIES IN A SWITCH ENABLED DEVICE

CROSS-REFERENCE TO RELATED APPLICATIONS

The present application claims priority from U.S. Provisional Application Ser. No. 61/018,929 entitled "Method And Apparatus For Transcoding Of Content Characteristics For Maximizing Content Playback Quality On A Range Of Players," filed on Jan. 4, 2008, U.S. Provisional Application Ser. No. 61/018,984 entitled "Switch Network Apparatus For Content Delivery Using A Web Service Proxy Coupling Content Providers to Electronic Devices," filed on Jan. 4, 2008, and U.S. Provisional Application Ser. No. 61/019,184 entitled "Method and Apparatus For Connecting Multiple Independent Content Providers To Consumer Electronic Devices For Content Distribution With DRM Metric," filed on Jan. 4, 2008, the benefit of the earlier filing dates of which are each hereby claimed under 35 U.S.C. §119 (e) and 37 C.F.R. §1.78, and wherein each are further incorporated herein by reference in their entirety.

TECHNICAL FIELD

The present invention relates generally to content delivery and more particularly but not exclusively to enabling a switch proxy service to convert or otherwise to transcode content from a native format into a format directed towards being optimized for playback by a switch enabled consumer electronic device (SED) by analyzing a set of best quality player capabilities that describes defined sets of characteristics of the content and then utilizing the player capabilities and sets of content characteristics to provide best playback quality

BACKGROUND

Sales in consumer electronics continue to increase at a steady pace. Estimates by the Consumer Electronics Association (CEA) have shown increases from around $107 billion in U.S. sales in 2003 to an estimate in U.S. sales of around 160 billion dollars in 2007. Consumer electronics sales include not only electronic equipment used in communications, and office productivity, but also electronic equipment used for entertainment. Such consumer electronic devices range therefore from calculators, printers, fax machines, and cameras, to mobile telephones, audio/video equipment, portable media players (PMPs), televisions, and personal computers.

At least some of this popularity may be due, at least in part, to the ease in which multimedia content may be readily, and often freely, accessed over the Internet from many different sources. Much of this content, however, is provided using the latest characteristics such as improved resolution, new encoding approaches, new methods for encryption, new network flow methods, the latest approaches to digital rights controls, and the sort. Unfortunately, not all of these new characteristics for the content are backward compatible. That is, an earlier configuration of a consumer electronics device may be unable to access and/or play at least some of the content configured with the newer characteristics.

A partial solution to this problem of device/content characteristic incompatibility is available for at least some consumer electronic devices, such as personal computers. For these select consumer electronic devices, when access is attempted for content having these newer characteristics, it may be possible to obtain tools needed to handle the new set of characteristics. For example, in the case of personal computers, it is not uncommon to download a new Compression/Decompression (CODEC) application, script, applet, program, plug-in, or other tool that is configured to handle the new characteristics. However, this solution is currently inadequate, since many of these tools are typically made available for only a subset of consumer electronic devices, and sometimes even only selected versions of those. For example, some of the tools may be available for personal computers having one operating system, but not for personal computers having a different operating system. Moreover, many consumer electronic devices may not have been configured to download and/or otherwise upgrade its configuration with such tools. For example, many televisions, set-top boxes, portable media players, and the like, may simply not be designed to be upgraded through this approach. Thus, many of these products remain unable to access content as it is revised and made available in newer formats and/or forms. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION

Figure 1:
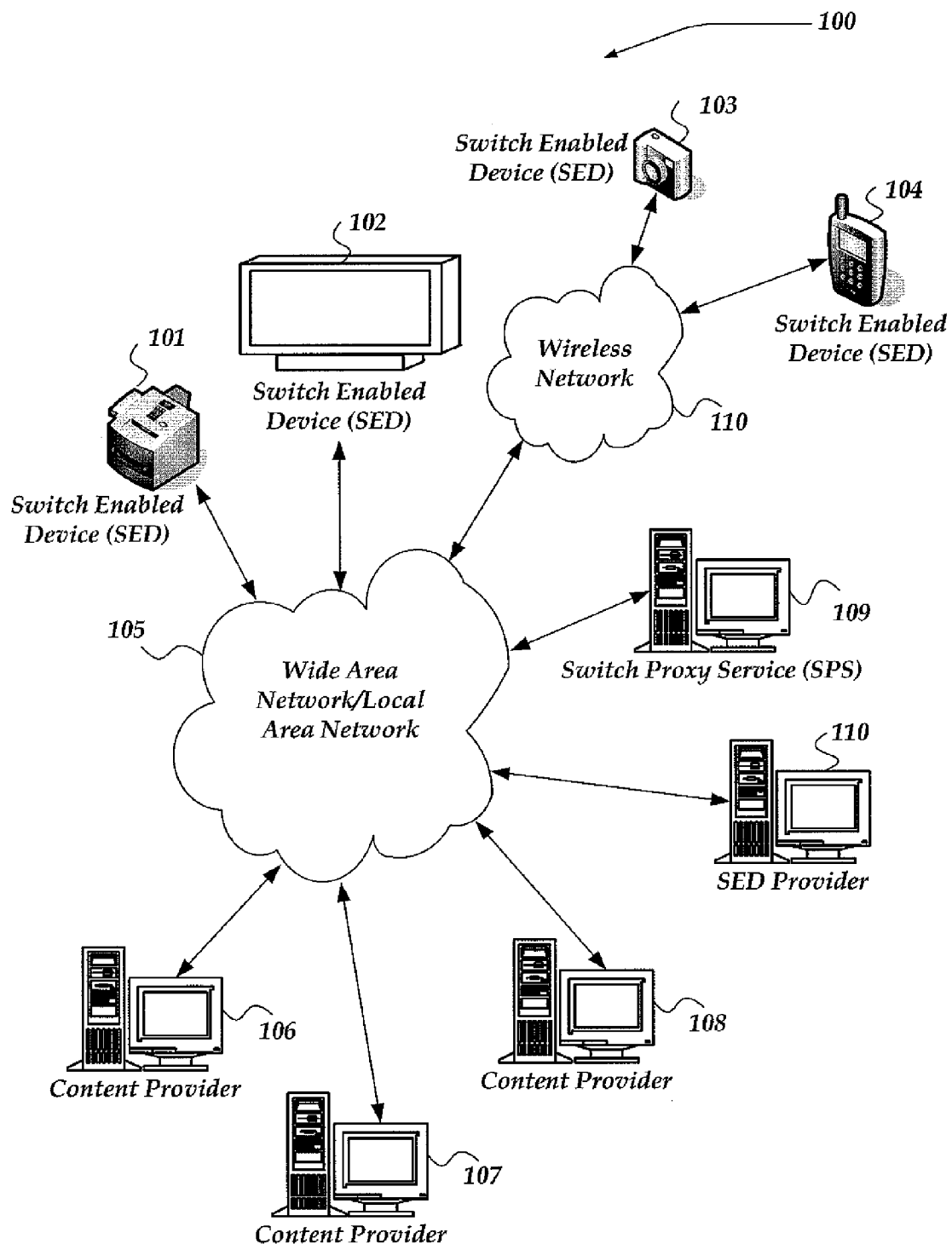
FIG. 1 shows a functional block diagram illustrating one embodiment of an environment for use in practicing embodiments of the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a,"[1] "an," and "the" include plural references. The meaning of "in" includes "in" and "on."

As used herein, the term "transcoding" refers to any conversion, translation, or changing of content from one form or format characteristic into another form or format characteristic of the content. Thus, transcoding includes, for example, converting content using one resolution into another resolution, from one encoding scheme into another encoding scheme, from use of one encryption technique into another encryption technique (or even into a non-encrypted form), or even converting from one form of network flow control to another network flow control approach. These examples of transcoding are not intended to be exhaustive. Instead, they are provided merely as illustrative examples to further improve the understanding of the term "transcoding." Thus, the invention should not be construed to be limited to these examples of transcoding. For example, transcoding may also include changing a color scheme for the content into a different color scheme, changing a gamma correction, or the like.

As used here, the term "content" refers to virtually any includes, but is not limited to motion pictures, movies, videos, music, pay-per-view (PPV), Video On Demand (VOD), interactive media, audios, still images, text, graphics, scripts, applications, and other forms of digital content useable by at least one consumer electronic device. However, content is not limited to these examples, and virtually any content may be included, without departing from the scope or spirit of the invention. In one embodiment, the content may be provided as a Moving Pictures Experts Group (MPEG) content stream, such as a transport stream, or the like. However, the invention is not so limited, and other file formats may also be employed, without departing from the scope or spirit of the invention. For example, content may also be provided using other file formats including, without limitation, Audio Interchange File Format (AIFF), Interchange File Format (IFF), Flash video files (.FLV), Wavform (WAV) audio format, Shockwave Flash (.SWF) files, H.263, H.264, Audio Video Interleave (AVI), Joint Photographic Experts Group (JPEG or JPG), Tagged Image File Format (TIF or TIFF), Graphics Interchange Format (GIF), Portable Network Graphics (PNG), or virtually any other file format, streaming format, or the like.

Content that is provided to the Switch Proxy Service (SPS) is typically provided in what is referred to herein as its "raw" or "native" format. Such native formats include the set of content characteristics with which the content is published or otherwise made available from its source. Such native formats may therefore include, but is not limited to those formats described above, as well as its encryption format, compression formats, color formats, digital rights structure, flow control mechanisms used, resolutions, or the like. The content characteristics that might describe content are not limited to these, non-exhaustive examples, and others may be included.

Briefly, various embodiments of the invention are directed towards providing a switch proxy service (SPS) that is configured and arranged to transcode content from a native format into a format that is directed towards being optimized for play at a switch enabled consumer electronic device (SED). As used herein, a SED is a consumer electronic device that has been configured or is capable of being configured to communicate with and receive content from the SPS. In one embodiment, the SPS may receive a SED capability set which includes sets of content characteristics for which the SED may use to provide a best playback quality.

In one embodiment, the content characteristic sets are, or are enabled to be, rank ordered into monotonically decreasing (or increasing) sets of content characteristics ordered by a quality level or value. In one embodiment, the ordered content characteristic sets may include a maximum quality set as well as a minimum quality set for a given SED. However, in one embodiment, a maximum quality set and a minimum quality set may have a same quality level or value.

Thus, as used herein, the term "maximum quality set" refers to a set of content characteristics of a given SED that has been designated with a 'highest' possible quality value for that SED. As further used herein, the term "minimum quality set" refers to a set of content characteristics of a given SED which have been designated with a 'lowest' possible quality value for that SED. A maximum quality set of content characteristics may be considered to provide a best playback quality of which the given SED is capable of, while a minimum quality set of content characteristics provide a lowest playback quality for which the given SED is capable of. However, it should be noted that a best playback quality for which the SED is capable of might not be achievable for a particular received content. Thus, the received content might be compared to other set of content characteristic quality levels within the SED capability set, or transcoded to conform to content characteristics for which the SED is capable.

Assume that one quality value range may be from a value of zero, indicating a worst or poorest quality ranking, to a value of 100, indicating a best possible quality ranking. Then, as described in more detail below in conjunction with FIG. 6, sets of content characteristics for a given SED may be given a quality value or level, and then rank ordered based on that quality value. The highest set of content characteristics in the rank ordering provides a maximum quality set, while the lowest set of characteristics provides the minimum quality set for that given SED. It should be noted, however, that for a given rank ordering that multiple sets of characteristics may have a same quality value or level. Thus, for example, there could be multiple 'maximum quality sets, and/or multiple minimum quality sets of content characteristics for a given SED. The collective sets of content characteristics provide the SED's capabilities for the identified content characteristics.

In any event, the SPS may store the capability set for the SED in a data store. In one embodiment, a device identifier that uniquely identifies the SED is associated with the stored set of SED capabilities. When a request for content is received, the SPS examines the request to determine if it is associated with a valid authorized unique identifier. If the request is determined to be valid and authorized, the SPS may provide content that may be transcoded based on the capabilities set for the SED. In one embodiment, the SPS provides the content transcoded as much as possible to satisfy the SED's best quality set of characteristics, but at least at or within the SED's minimum/maximum quality content characteristics for a given set of content characteristics. In one embodiment, the content may be provided to the SED at least partially encrypted.

The SPS may receive content for storage at the data store from a content provider, where the content may be stored until a request is received by a SED. In another embodiment, the SPS may receive content after a request for the content is received. For example, SPS may receive the request, and then may proxy the request to a content provider. It should be noted that in at least one embodiment, a SED may be unable to send a request for content, and may merely be configured to provide its unique identifier, and/or to receive content. Thus, in one embodiment, a request to have content sent to a SED may also be received from another SED, another consumer electronic device, or other network device that is configured to provide the unique device identifier of the SED for which the content is destined.

The SPS may analyze capabilities received about one or more SEDs and determine possible transcoding schemes for content. In this manner, in one embodiment, the SPS may perform transcoding on content prior to receiving a request for the content, and thereby save time, and/or other resources. Thus, in one embodiment, the SPS may save the content already transcoded based on capabilities for a plurality of SEDs having the same capabilities, or based on other events, conditions, or the like. For example, if SPS determines that a particular capability configuration is requested regularly, the SPS may transcode content into that configuration and store it in anticipation of a request. Thus, in one embodiment, the SPS may receive the content in its native format, transcode it, and store it based on a most frequently requested SED format, a most resource intensive transcoding form/format, or the like. However, as noted, the SPS may also perform the transcoding of content from its native format to a SED capable format, virtually on-the-fly, upon receiving a request for the SED capable content (and/or the content).

Moreover, when a request for content is received, real-time metrics may be obtained about the request, including, a type of content being requested, characteristics about the SED for which the content is to be provided, how often content is sent to the SED, and the like. Such real-time content request information may then be provided to content providers, SED providers, advertisers, or the like, for use in targeting a SED owner within specific advertisements based on the content; providing information useable in sales to content providers, and even providing information useable to SED providers about how their SEDs are being used. However, use of such real-time metrics is not limited to these examples, and others uses may also be made of the information. In one embodiment, such real-time information might be sold to such various consumers.

Illustrative Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, switch enabled devices (SEDs) 101-104, content providers 106-108, SED provider 110, and Switch Proxy Service (SPS) 109.

One embodiment, of a switch enabled consumer electronic device (SED) is described in more detail below in conjunction with FIG. 2. Briefly, however, SEDs 101-104 include virtually any consumer electronic device that is configured to receive content over a network such as networks 110 and/or 105. Moreover, a SF-D is any consumer electronic device that is either capable of being registered with and receive content from SPS 109. Such devices may include but are not limited to wireless devices such as cellular telephones, smart phones, display pagers, radio frequency (RF) devices, infrared (IR) devices, Personal Digital Assistants (PDAs), digital SLR cameras, cameral phones, digital picture frames, portable GPS receivers, mobile gaming devices, digital point-and-shoot camera, camcorders, wearable computers, tablet computers, multimedia cell phones, integrated devices combining one or more of the preceding devices, or the like. SFDs 101-104 are not limited, however, to wireless devices, and may further include, but is not limited to wired devices, such as digital televisions, digital video players, game consoles, printers, set-top boxes, and the like. In one embodiment, SEDs 101-104 may also include consumer electronic devices that are configured to operate over a wired and/or a wireless network.

SEDs 101-104 may further include personal desktop computers, laptops, multiprocessor systems, microprocessor-based electronics, network PCs, or the like. Thus, SEDs may also include consumer electronic devices typically considered by some as potentially capable of receiving tools that may handle the latest content characteristics, but for various reasons may be constrained from being upgraded.

Thus, SEDs 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages such as email, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

The client application may further provide information that identifies itself, including a type, capability, name, or the like. In one embodiment, SEDs 101-104 may uniquely identify themselves through any of a variety of mechanisms, including a phone number, Mobile Identification Number (MIN), an electronic serial number (ESN), Internet Protocol (IP) address, network address, a hardware device identifier, or other unique device identifier.

SEDs 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

SEDs 101-104 also may include at least one other client application that is configured to receive from and to send content to another computing device. The client application may include a capability to provide and/or receive textual content, multimedia information, or the like.

SEDs 101-104 may include a client application that enables the user to log into a user account that may be managed by another computing device. Such user account, for example, may be configured to enable the user to request and/or receive content for play at the SED. However, content may also be requested and/or received by a SED independent of having logged into a user account.

SEDs 101-104 are further configured to request service from SPS 109. Such request for service may include, but is not limited to requesting registration by SPS 109, providing a SED's set of content capabilities, requesting content, receiving content, or the like. For example, SEDs 101-104 may initially communicate with SPS 109 and provide its unique device identifier to SPS 109 to register with SPS 109. SEDs 101-104 may further provide SPS 109 with its set of capabilities useable to determine a form/format characteristic for transcoding content for use by the SEDs. One embodiment of a set of capabilities that SEDs 101-104 and/or SED provider 110 may provide is described in more detail below in conjunction with FIG. 6. SEDs 101-104 may further request content and/or receive transcoded content from SPS 109 for play.

Wireless network 110 is configured to couple SEDs 103-104 with network 105. Wireless network 110 may include any of a variety of wireless sub-networks that may further overlay stand-alone ad-hoc networks, or the like, to provide an infrastructure-oriented connection for SEDs 103-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for SEDs, such as SEDs 103-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between SEDs 103-104 and another computing device, network, or the like.

Network 105 is configured to couple SEDs 101-102, content providers 106-108, SED provider 110, with SPS 109 and through wireless network 110 to SEDs 103-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data transport mechanism and includes any information delivery media. By way of example, communication media includes wired media such as twisted pair, coaxial cable, fiber optics, wave guides, and other wired media and wireless media such as acoustic, RF, infrared, and other wireless media.

Content providers 106-108 include virtually any computing device that is configured and arranged to provide any of a variety of content and/or services over a network. As such, content providers 106-108 may operate as an electronic store, a free viewing and download site for content, a shared content site, or the like. In one embodiment, content providers 106-108 are configured to operate as website servers. However, content providers 106-108 are not limited to web servers, and may also operate a messaging server, a File Transfer Protocol (FTP) server, a database server, content server, and the like. Additionally, each of content providers 106-108 may be configured to perform a different operation. Thus, for example, content provider 106 may be configured as a website server for multimedia content, while content provider 107 is configured as a database server for a variety of content. Moreover, while content providers 106-18 may operate as other than a website, they may still be enabled to receive an HTTP communication.

In one embodiment, content providers 106-108 may receive a request for content. In response, content providers 106-108 may provide the content based on the content's native or raw form/format. Thus, content may be provided in one embodiment, based on a latest form/format, such as a latest file format, encoding, method, resolution, or other characteristics of the content.

In one embodiment, content providers 106-108 may also send content in its native form/format to SPS 109 for transcoding. In one embodiment, content providers 106-108 may receive a request for the content from SPS 109; however, in another embodiment, content providers 106-108 may have an arrangement such that content is pushed to SPS 109 based on some condition, event, time schedule, or the like. In one embodiment, the content may be provided as a free service. In another embodiment, the content may be purchased. In still another embodiment, the content may be provided with advertisements either attached to, or embedded within the content, or separately, such that SPS 109 may subsequently provide the advertisement to one or more of SEDs 101-104.

Devices that may operate as content providers 106-108 include personal computers desktop computers, multiprocessor systems, microprocessor-based or programmable consumer electronics, network PCs, servers, and the like.

SED provider 110 represents virtually any network device that may be configured and arranged to provide information about a SED to SPS 109. Thus, in one embodiment, SED provider 110 may be operated by or for, an original equipment manufacturer, a SED merchant, or the like. SED provider 110 may be employed to provide SPS 109 with a set of capabilities for SEDs. Thus, for example, SED provider 110 may provide SPS 109 with a set of capabilities for a SED given the SEDs unique device identifier, based on a group of unique device identifiers, or the like. In this manner, SPS 109 may obtain the set of capabilities for a SED from the SED, and/or from SED provider 110.

In one embodiment, SED provider 110 may be further configured to register a SED with SPS 109 such that the registered SED is switch enabled to receive transcoded content that may be directed towards being optimized for the SED's set of capabilities. Devices that may operate as SED provider 110 include personal computers, desktop computers, multiprocessor systems, microprocessor-based or programmable consumer electronics, network PCs, servers, and the like.

One embodiment of SPS 109 is described below in more detail in conjunction with FIG. 3. Briefly, however, SPS 109 includes virtually any network device that may be configured and arranged to operate as an access point through which any of SEDs 101-104 may obtain content from content providers 106-108 with a defined content characteristic set that is consumable on the SED in a way that is directed towards a best quality the SED is capable of.

SPS 109 may manage registration of a SED either requested from the SED, and/or from SED provider 110. In one embodiment, registration may be free. However, in another embodiment, registration may include payment or obligation of payments. For example, in one embodiment, when an account is activated for use with a SED, a credit card or other payment method may be identified. In one embodiment, the communications may be performed over a secure transaction service, such as SSL/TLS, or the like. Thus, in one embodiment, SPS 109 may be configured to manage purchases of subscriptions, purchases of content, and to manage licenses associated with such purchases. Thus, in one embodiment, SPS 109 may also manage digital rights management, key management schemes associated with the content access; provide secure transmissions for communications, and the like.

In one embodiment, SPS 109 may receive a set of capabilities for the SED that indicates at least a minimum, a maximum, and best quality set(s) of content characteristics for the SED. In one embodiment, the set of capabilities may be received in a monotonically ranked order of sets of content characteristics for the SED. In another embodiment, SPS 109 may perform the rank ordering based on quality values or levels for each set of content characteristics. The set of capabilities for the SED identifies defined sets of content characteristics and ranges from which the content characteristic is expected not to exceed for the SED, and further at least one best quality set for the defined content characteristics for which the SED is configured. SPS 109 may further receive a unique device identifier for the registered SED that may be associated with the provided set of capabilities. In one embodiment, SPS 109 may include a data store that is configured to store the set of capabilities and the unique device identifier.

SPS 109 may further provide an interface useable by a consumer electronic device, such as SEDs 101-104, or the like, to browse and/or search for content. SPS 109 may provide such interface using any of a variety of mechanisms, including, but not limited to a browser interface, a SED unique screen interface, or even through interface commands, menus, text messaging, scripts, or the like, that communicate through the SED's interface. SPS 109 may provide visibility through the interface of available content from content providers 106-108 for access by the SED. Thus, in one embodiment, SPS 109 may provide differing interfaces based on a mode of communication, a requesting device, or the like. Moreover, in at least one embodiment, a user may be allowed to establish a profile with their own interface preferences of look and feel, genre of content, or the like. The user may also be allowed to change and/or customize the interface for their particular tastes, but, in one embodiment, SPS 109 may also be configured to enable a content provider, or other entity, to influence a look and feel. For example, in one embodiment, SPS 109 may be configured to provide sponsored activities, services, and/or content, including advertisements, for display within the interface.

In one embodiment, SPS 109 may be configured to provide opt-in/opt-out advertising, where a user would have the option to receive advertising. For those users that may want targeted advertising, SPS 109 may enable the interface to allow the user to specify information indicating a type of advertising, a length of time they may want the advertising displayed, or the like. In one embodiment, a selection to receive the advertising may be coupled with a reward to the user, a reduction in a subscription, or other options, service additions, or the like.

SPS 109 may be further configured to manage authentication/authorization of a request, based in part on the unique device identifier, and/or user account. Thus, in one embodiment, SPS 109 may receive a request for content, and then based on the unique device identifier and/or user account identifier received, determine whether the request is valid and authorized to access the requested content. In some embodiment, the content may be restricted based on a license, a subscription by a user, a policy, or the like. Thus, while the unique device identifier may be valid, the user account may not be authorized to access the content. Thus, SPS 109 is further configured to provide a message so indicating if the request is denied, whether it is because of the content restriction, the invalidity of the unique device identifier, or any of a variety of other reasons.

SPS 109 may be further configured to perform a variety of other actions, including, but not limited to proxying the request for the content to one or more of content providers 106-108, examining a data store for the content, or the like. SPS 109 may then, examine a set of capabilities for the SED for which the content is to be provided, and determine whether and/or how to transcode the content for use by the SED. In one embodiment, SPS 109 may attempt to transcode the content so that it aligns with the best quality set of content characteristics for the SED. For a variety of reasons, the content may not be suitable for such transcoding. This may arise, for example, where the content is incompatible with one or more content characteristics of the best quality set. For example, a gamma correction identified with a best quality set may not be achievable given a particular content's native form/format. Thus, in one embodiment, SPS 109 is configured to attempt to balance the set of content characteristics based on the best quality sets, while preventing any content characteristic from exceeding the SED's maximum quality set of content characteristics, or dropping below the SED's minimum quality set of content characteristics. Moreover, SPS 109 may employ a process substantially similar to the process described below in conjunction with FIG. 4 to perform at least some of its actions.

Devices that may operate as SPS 109 include personal computers desktop computers, multiprocessor systems, microprocessor-based or programmable consumer electronics, network PCs, servers, and the like.

It should be recognized that while SPS 109 is illustrated as a single network device, the invention is not so limited. Thus, for example, SPS 109 may be configured to distribute one of more of its functions across one or more network devices. Moreover, in at least one embodiment, SPS 109 may be replicated to operate within different geographical regions of the world, to provide dedicated services to those regions, to provide backup/failure support, or the like. Moreover, one or more network devices may be configured to operate solely or at least in part for failure recovery support to another network device.

Illustrative Client Environment

Figure 2:
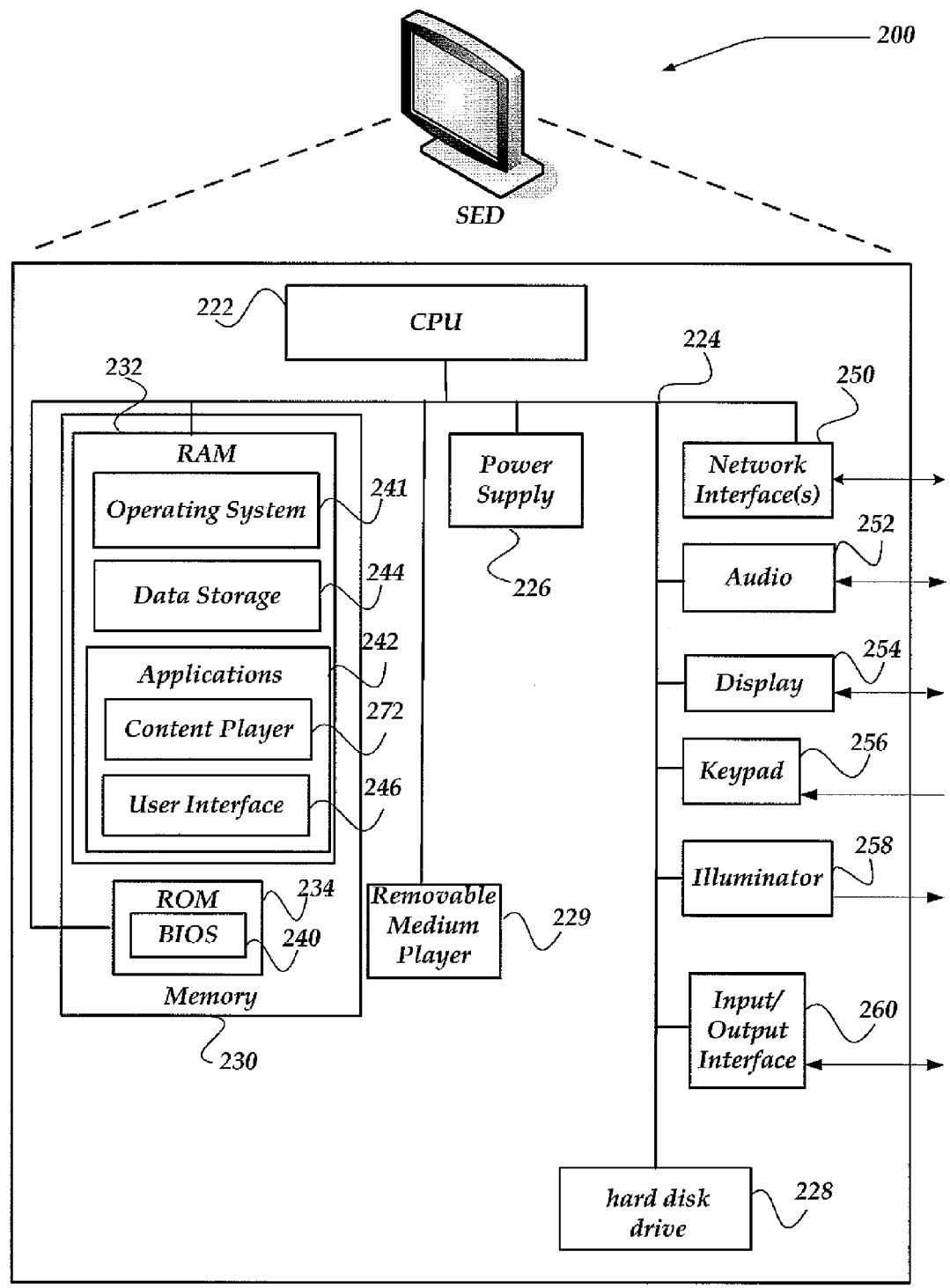
FIG. 2 shows one embodiment of a switch enabled consumer electronic device (SED) that may be employed within the environment illustrated in FIG. 1.

FIG. 2 shows one embodiment of a possible SED 200 that may be included in a system implementing the invention. SED 200 may include many more or less components than those shown in FIG. 2. However, the components shown are sufficient to disclose an illustrative embodiment for practicing the present invention. While SED 200 may represent, for example, one of SEDs 101-104 of FIG. 1, it should be readily apparent that because of the variety of possible configurations of consumer electronic devices, no one configuration fully represents all possible SEDs. Thus, SED 200 is not intended to be an exhaustive illustration of SEDs 101-104. Nor is FIG. 2 intended to narrow the scope of the invention in any manner. Instead it is provided merely as one possible SED usable by the invention.

Thus, within that context, as shown in the figure, SED 200 includes a processing unit (CPU) 222 in communication with a mass memory 230 via a bus 224. SED 200 also includes a power supply 226, one or more network interfaces 250, an audio interface 252, video interface 259, a display 254, a keypad 256, an illuminator 258, an input/output interface 260, and haptic interface 262. Power supply 226 provides power to SED 200. A rechargeable or non-rechargeable battery may be used to provide power. The power may also be provided by an external power source, such as an AC adapter or a powered docking cradle that supplements and/or recharges a battery.

Network interface 250 includes circuitry for coupling SED 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound, music, or the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. In one embodiment, display 254 may represent a digital television screen.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. In one embodiment, keypad 256 may also represent an interface to a handheld remote control input device, such as might be employed with a television, DVR, or the like.

Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

SED 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Optional Haptic interface 262 is arranged to provide tactile feedback to a user of the client device.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of SED 200. The mass memory also stores an operating system 241 for controlling the operation of SED 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by SED 200 to store, among other things, applications 242 and/or other data. For example, data storage 244 may also be employed to store information that describes various capabilities of SED 200. The information may then be provided to another device based on any of a variety of events, including being sent as part of a header during a communication, sent upon request, or the like. Moreover, data storage 244 may also be employed to store personal information including but not limited to personal preferences, or the like. In one embodiment data storage 244 may be configured to store various content, digital rights licenses, encryption/decryption keys, or the like. At least a portion of the information may also be stored on a disk drive or other storage medium within SED 200, such as hard disk drive 228, removable medium player 229, or the like. In one embodiment, a portion of the information may also be located remote to SED 200.

Applications 242 may include computer executable instructions which, when executed by SED 200, transmit, receive, and/or otherwise process messages, multimedia information, and enable telecommunication with another user of another client device. Other examples of application programs include browsers, task managers, content selection interfaces, database programs, security applications, games, search programs, and so forth. Applications 242 may also include content player 272, and user interface 246.

User interface 246 may be configured to receive input and to display information to a user. User interface 246 may, for example, receive and display (and/or play) graphics, text, multimedia, audio data, and the like, employing virtually any interface type of mechanism. User interface 246 may be enabled to allow a user to register SED 200 with a content provider, a Switch Proxy Service (SPS), or other entity. User interface 246 may allow a user to provide subscription information, set user preferences, modify display options, or the like. User interface 246 may further enable a user to browse and/or otherwise search for and request content for display or otherwise enjoyment at SED 200. User interface 246 may further allow the user to access the content, play the content, delete content, store the content, or otherwise manage enjoyment of the content.

Content player 272 represents any of a variety of applications and/or hardware that is configured to enable enjoyment of content, including, but not limited to video content players, music content players, photo content players, or the like. Moreover, content player 272 may provide an interface separate from or integrated with user interface 246 that enables editing of the content, storing the content, replay of the content, sharing of the content, duplicating of the content, or the like. In one embodiment, content player 272 may manage such activities based, at least in part, on digital rights, encryption/decryption rights, or the like, associated with the content.

In one embodiment, content player 272 might be configured, for any of a number of reasons, to be restrained to being able to play content having particular content characteristics. For example, in one embodiment, content player 272 might be configured to play content at one resolution, or at several different resolutions, but not at other resolutions. Similarly, in another non-exhaustive example, content player 272 might be capable of playing content using one file format, or several different file formats, but unable to play content having a file format characteristic that is yet another file format. Thus, content player 272 may have a definable set of capabilities for which content may be playable, and another set for which content player 272 is unable to playback.

Illustrative Server Environment

Figure 3:
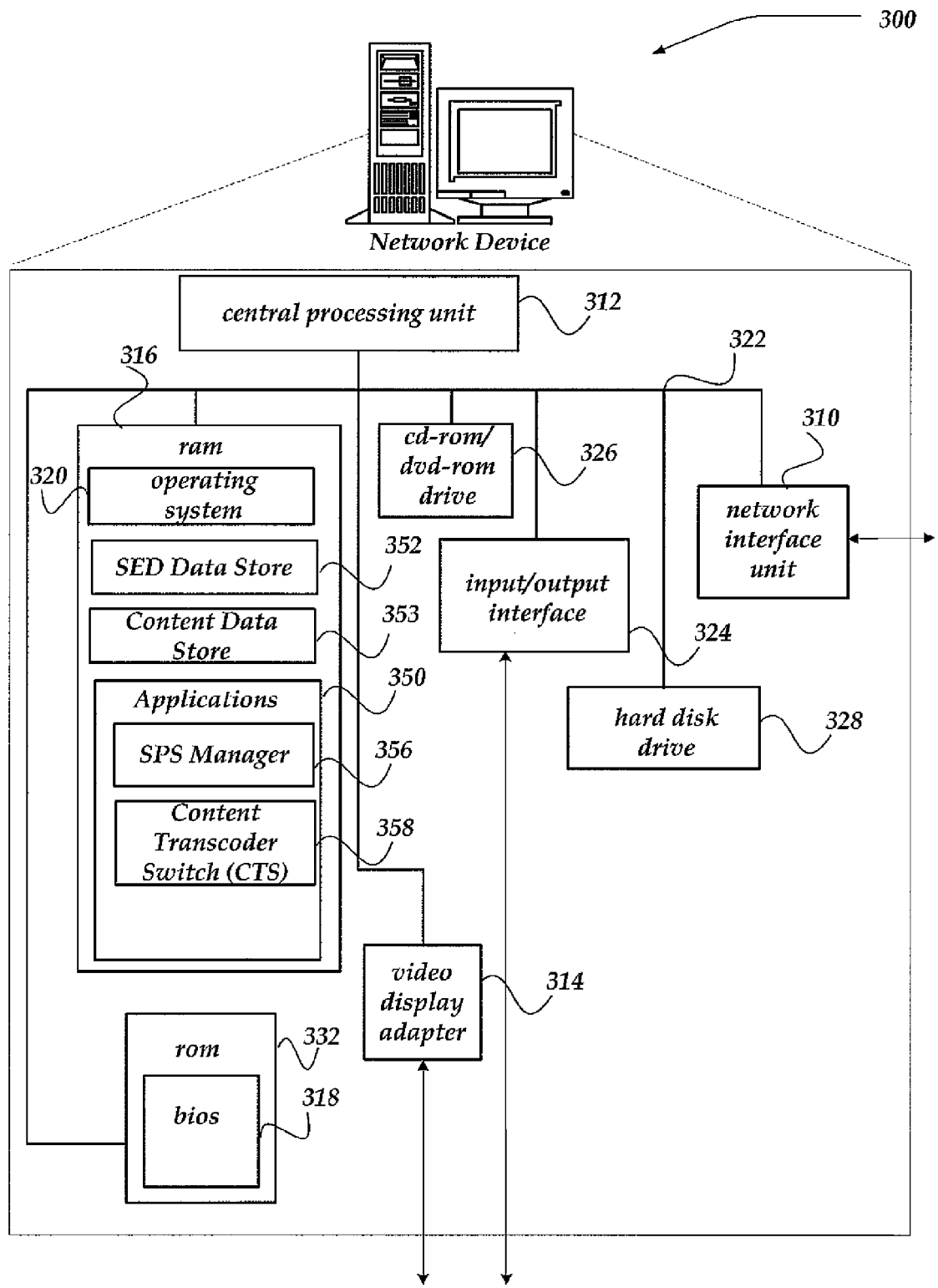
FIG. 3 shows one embodiment of a network device that may be employed to provide content transcoding.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may, for example, represent SPS 109 of FIG. 1.

Network device 300 includes processing unit 312, video display adapter 314, and a mass memory, all in communication with each other via bus 322. The memory generally includes RAM 316, and ROM 332. Network device 300 also includes one or more mass storage devices, such as hard disk drive 328, tape drive, optical disk drive, and/or floppy disk drive. The memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol, and/or any of a variety of digital television communication protocols, wireless protocols, or the like. Network interface unit 310 is sometimes known as a transceiver, transceiving device, network interface card (NIC), or the like.

Network device 300 may also include an SMTP handler application for transmitting and receiving email. Network device 300 may also include an HTTP handler application for receiving and handing HTTP requests, and an HTTPS handler application for handling secure connections. The HTTPS handler application may initiate communication with an external application in a secure fashion.

Network device 300 also may include input/output interface 324 for communicating with external devices, such as a mouse, keyboard, scanner, or other input devices not shown in FIG. 3. Likewise, network device 300 may further include additional mass storage facilities such as optical disk drive 326 and hard disk drive 328. Hard disk drive 328 is utilized by network device 300 to store, among other things, application programs, databases, or the like.

The memory and/or mass storage as described above illustrates another type of computer-readable media, namely computer readable storage media. Computer storage readable media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 350 are loaded into memory and run on operating system 320. Examples of application programs include schedulers, calendars, transcoders, database programs, word processing programs, spreadsheet programs, security programs, web servers, and so forth. Mass storage may further include applications such SED data store 352, content data store 353, SPS manager 356, and content transcoding switch (CTS) 358.

SED data store 352 is configured and arranged to store and otherwise manage information useable in registration of a SED, including, but not limited to such information as unique device identifiers, set of capabilities for SEDs, subscription information for a user, user preferences, and the like. Thus, data store 352 may store information about a user's account, content subscription, content preferences, user interface preferences, and the like. However, SED data store 352, however, is not limited to managing storage of these example items, and other items, data, information, or the like, may also be stored within SED data store 352, without departing from the scope of the invention. For example, SED data store 352 may also include entitlement information, digital rights, licenses, and the like associated with content accessible by a user/SED. In one embodiment, SED data store 352 might even include a digital certificate, public/private encryption/decryption keys, or the like, for managing requested content, authenticating a user account, request, or the like. SED data store 352 may be implemented using a variety of technologies, including, but not limited to, folders, spreadsheets, data bases, scripts, applications, or the like.

Content data store 353 is configured and arranged to store and otherwise manage content whether it be content in its received native form/format, and/or content that is transcoded for use by one or more SEDs based on a received set of capabilities for the SED(s). In one embodiment, the content may be stored in encrypted form; however, other content may be stored unencrypted or 'in-the-clear.' Content data store 353 may also provide a mechanism that enables a user to browse and/or otherwise search for stored content. Content data store 353 may be implemented using a variety of technologies, including, but not limited to, folders, spreadsheets, data bases, scripts, applications, or the like.

SPS Manager 356 is configured and arranged to perform actions including but not limited to SED registration; user registration and profile management, including, but not limited to setting user interface options, parental controls, and the like; content aggregation, search, collection management, and transcoding, including providing the content in response to a valid/authorized request; managing secure transactions, and purchase protections. SPS manager 356 may further be configured to manage authorization and validation of requests for content, digital rights management, and the like.

SPS manager 356 is further configured to interact with one or more content providers to proxy requests for content, receive content based on a subscription, a push arrangement, or the like. In one embodiment, SPS manager 356 may be configured to attach or otherwise associate advertising with content for access by a SED. SPS manager 356 may further provide rewards, incentives, and otherwise manage financial transactions associated with access to content with the users, with content providers, with SED providers, financial institutions, and/or other entities associated with content access by a SED.

Furthermore, SPS manager 356 may communicate with CTS 358 to request transcoding of content for use by a SED. In one embodiment CTS 358 may receive the content that is to be transcoded. In one embodiment, the content may be encrypted, in which instance, CTS 358 may store the content until needed to be transcoded, and/or decrypt the content transcode it, encrypt the transcoded content, and then store it in content data store 353 until a request for the content is received.

CTS 358 may examine SED data store 352 to determine whether to transcode the content for storage based on a commonality of SED capability sets. That is, CTS 358 may determine that a significant number of SEDs employ a same set of capabilities. This may be the case, for example, where a number of users purchased the same SED configuration. In this instance, CTS 358 may select to transcode the received content based on the one or more common capability sets. CTS 358 may then store the transcoded content for a subsequent request. CTS 358 may, in one embodiment, perform such actions a plurality of times, based on commonality of capability sets, policies, and the like. Thus, CTS 358 might determine that such advanced transcoding might be reasonable where a large number of SEDs, such as greater than some defined number, employ the same capability set, but, not if the number of SEDs are below that defined number.

CTS 358 may also be configured to perform transcoding, virtually on-the-fly. That is, upon receiving a valid/authorized request for content, CTS 358 may access content in its native form/format, and transcode it. CTS 358 may then provide the content to SPS manager 356 to provide the content to the SED.

CTS 358 may perform transcoding by examining sets of capabilities for a SED, including at least the minimum, maximum, and best quality set of content capabilities. CTS 358 will then examine the native form/format of the content to determine whether one of the identified best qualities of content characteristics may be satisfied. If so, CTS 358 will transcode the content to one of the best quality sets of content characteristics for the SED. If however, CTS 358 determines that the content can not be provided in the best quality for the SED, CTS 358 will attempt to blend the various content characteristics to attempt to be as close as reasonable to the best quality while maintaining a useable product. Thus, if CTS 358 determines that modifying one content characteristic to satisfy the best quality may result in degradation of another content characteristic, CTS 358 may instead attempt to balance the two (or more) content characteristics. However, CTS 358 will seek to maintain each of the content characteristics being transcoded such that the content characteristics are within or at the minimum/maximum quality sets of content characteristics for the SED. Thus, for example, if in transcoding the content, a content characteristic falls outside of the minimum/maximum quality sets of content characteristic parameters, then CTS 358 will reset the content characteristic to that exceeded limit. In this manner CTS 358 will ensure that the content is at least useable by the SED, and at best, optimized towards the best quality of content characteristics for the capability of the SED.

Moreover, CTS 358 is configured to manage virtually any native content characteristic. Thus, CTS 358 may be configured and arranged to further be upgraded or modified to receive information about a latest content form/format, such that it may be able to transcode the content. Thus, CTS 358 may be configured with one or more pluggable components, or the like, configured to 'learn' about new content forms/formats.

Although CTS 358 is illustrated as distinct from SPS manager 356, the invention is not so limited. For example, in one embodiment, CTS 358 may operate within SPS manager 356, without departing from the scope of the invention. Moreover, SPS manager 356 may be configured to inhibit the sending or transcoding of content to a SED, based on whether the user account is unauthorized and/or the device identifier is invalid. In one embodiment, SPS manager 356 may employ a process substantially similar to the process described in more detail below in conjunction with FIG. 4.

Generalized Operation

Figure 4:
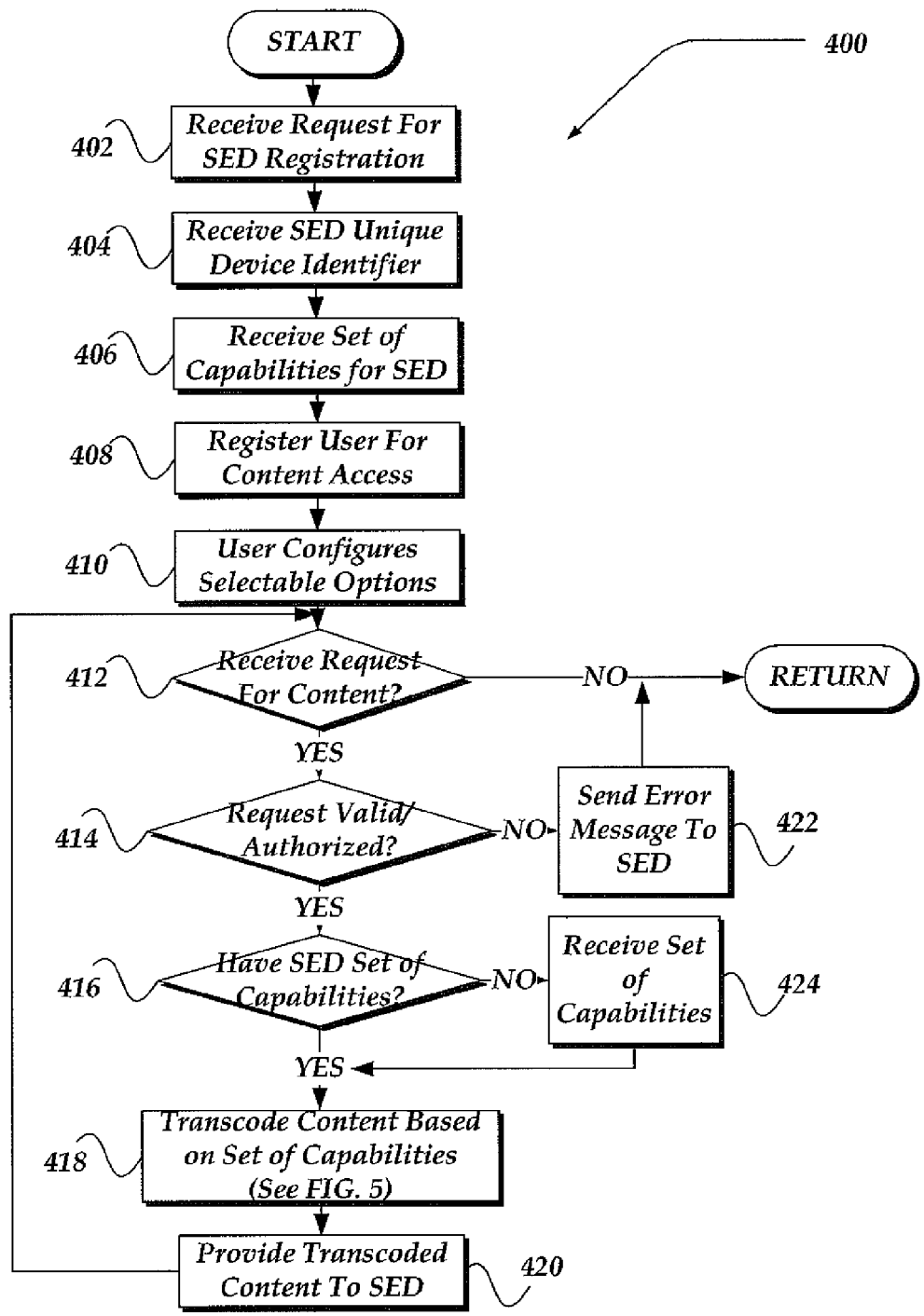
FIG. 4 illustrates a flow diagram generally showing one embodiment of an overview of process for managing access to transcoded content for play by a SED.

The operation of certain aspects of the present invention will now be described with respect to FIG. 4. FIG. 4 illustrates a flow diagram generally showing one embodiment of an overview of process for managing transcoded content for play by a SED. Process 400 of FIG. 4 may be implemented, for example, within SPS 109 of FIG. 1.

Process 400 begins at block 402, where a request is received to register a SED. In one embodiment, the registration might occur when a user selects to purchase the SED from a merchant. That is the user might select a consumer electronic device that is Switch enabled for purchase at a store, through a website, or the like, and opt to have the consumer electronic device be switch enabled. The SED may be registered through the user upon receipt of the device, or as part of a purchase transaction by the merchant. Thus, at block 402, the SED might be connected with a network and enabled to send a request to register with a Switch Proxy Service (SPS).

At block 404, the SED may provide its unique device identifier over the network to the SPS. Processing continues to block 406, where, in one embodiment, the SED may also provide its set of capabilities, including, but not limited to a minimum quality set of content characteristics, a maximum quality set of content characteristics, and other quality sets of content characteristics. One embodiment of a possible configuration for the provided set of capabilities is described in more detail below in conjunction with FIG. 6.

It should be noted, that the invention is not limited to such approach for registration, and sending of a SED's unique device identifier, and/or set of capabilities. For example, in one embodiment, the set of capabilities may be provided by the SED upon registration of a user, each time a request for content is received, or even provided by another entity, such as a SED provider, or the like.

In any event, process 400 may then flow to block 408, where the user may also register with the SPS to receive content. Such registration might include, but is not limited to providing a user name, password; financial information such as credit card information, and the like; and the like. In one embodiment, as noted above, the user might provide the set of capabilities for the SED during user account generation/setup. It should be noted, that such user account registration actions may be performed using the SED, or even through a different network device.

Processing then flows then flows to block 410, where the user may further configure a variety of user selectable options, including, but not limited to opting in/out for advertisements, configuring the user interface, identifying content types, classifying content, and the like. Again, block 410 may be performed through the SED, or another network device.

Process 400 flows next to decision block 412, where a request for content may be received. In one embodiment, the request may be preceded by the user browsing and/or otherwise searching for content over the network. In another embodiment, the user might have established a content push arrangement, where the content is implicitly requested, such as through a subscription based approach, whereby content is pushed to the SED based on some time period, event, condition, or the like. Moreover, the request for the content might be received from a network device other than the SED for which the content is destined for. In any event, accompanying the request, or based on a series of communications, the unique device identifier for the SED is provided to the SPS. In any event, if not request for content is received, processing may return to a calling process to perform other actions. If a request for content is received (including through a push arrangement), processing continues to decision block 414.

At decision block 412, or at virtually any time after a request for content is received, information about the request may be gathered, virtually in real-time, Information about the request may include, but is not limited to a type of content being requests, characteristics about a SED for which the content is to be provided, how often content is requested for a given SED, or type of SED, where the request is received from, including geographic related information about the request, and the like. The information gathered about the request may then be combined within other information, in one embodiment, and provided to one or more possible consumers of such information, including, but not limited to advertisers, content providers, SED providers, or the like. In one embodiment, the charge may be requested for providing the information.

At decision block 414 a determination is made whether the request is valid and authorized. Validation of the request may be performed based on a determination that the SED for which the unique device identifier is provided is registered. Authorization may include, but not be limited to whether the user's access rights to the requested content authorizes or allows the user access to the content. This may not be the case, for example, where the user's account has expired; the user has requested content that is restricted from access by the user; or the like. In any event, if the unique device identifier and user account request are valid and authorized, processing flows to decision block 416; otherwise, processing flows to block 422, where an error message may be sent to the SED or other requesting network device. After block 422, processing returns to a calling process to perform other actions.

At decision block 416, a determination is made whether the set of capabilities for the SED are received. This may arise, as stated above, based on an approach used to provide the information—e.g., through the SED provider, each time a request is received, when a first request for content is received for the SED, or the like. In any event, if the set of capabilities are not received, processing flows to block 424, where a request is made for the set and the set is received. Processing flows next to block 418. If the set of capabilities were already received at decision block 416, then processing flows to block 418.

One embodiment of block 418 is described in more detail in conjunction with FIG. 5 below. However, briefly, at block 418, the requested content is transcoded in an attempt directed towards being optimized for play for the SED based on the set of minimum quality set, the maximum quality set, and other quality sets of content characteristics in the received set of capabilities.

Processing continues to block 420, where the transcoded content is provided over the network to the SED. Processing then loops back to decision block 412. It should be noted, however, that while process 400 is illustrated as looping back to block 410, the process is not limited to such implementation. Clearly, a user may be enabled to modify their user selectable options, virtually at any time during or even outside of process 400. Thus, the user might, through various inputs, jump into block 410 at virtually any time.

Figure 5:
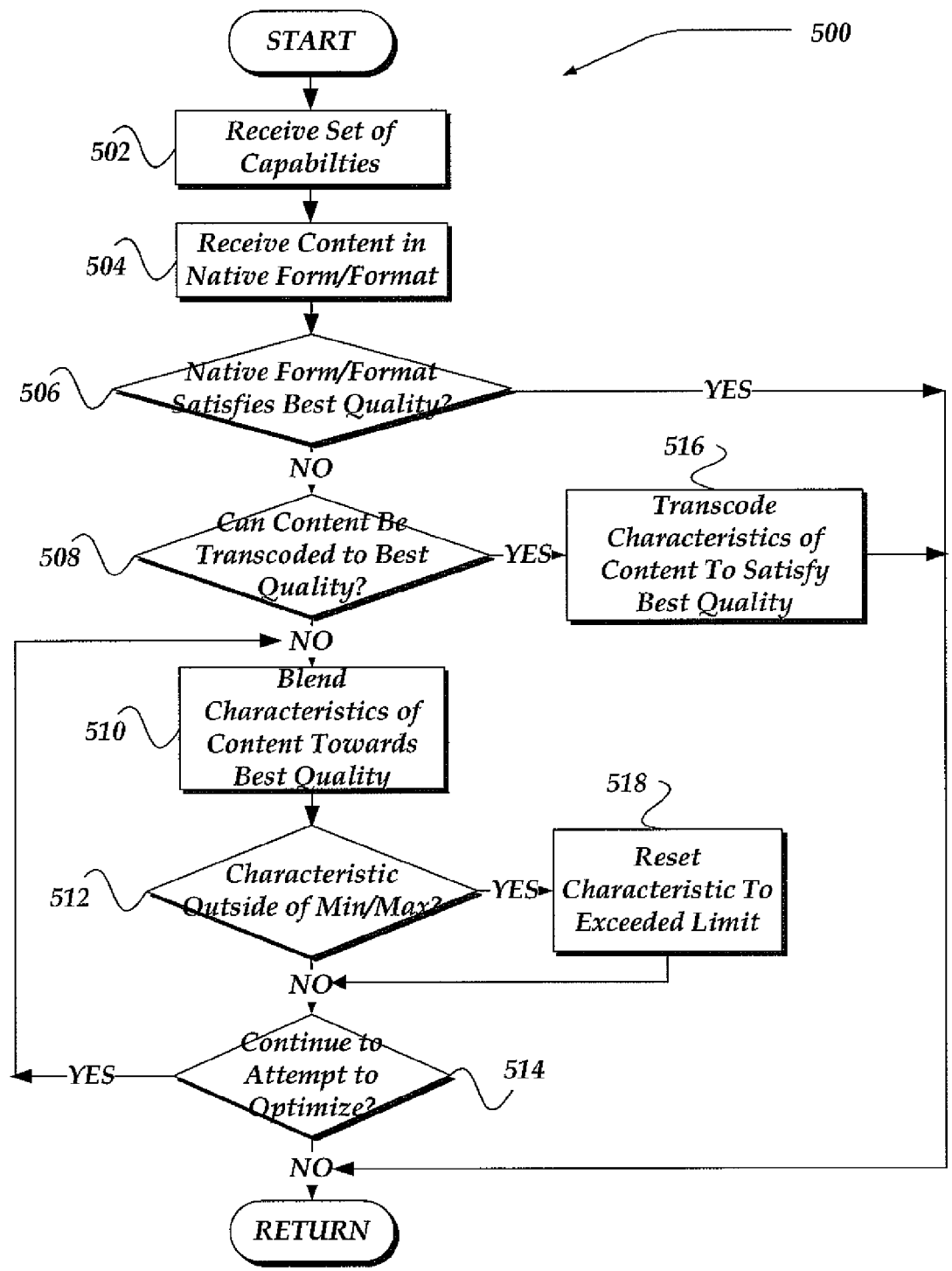
FIG. 5 illustrates a flow diagram generally showing one embodiment of an overview of process for transcoding content from a native format into a format directed towards being optimized for play by a SED.

FIG. 5 illustrates a flow diagram generally showing one embodiment of an overview of process for transcoding content from a native format into a format directed towards being optimized for play by a SED. Process 500 of FIG. 5 may be implemented as one embodiment of block 418 of FIG. 4. However, the invention is not limited to using process 500, and other embodiments for transcoding content may also be employed. Moreover, as described above, process 500 may be performed prior to receiving a request for content, such as might arise, where the invention pre-transcodes content as described above.

In any event, process 500 begins, after a start block, at block 502, where a set of capabilities for a SED. Processing continues to block 504, where the content is received in its native form/format.

Processing continues to decision block 506, where the best quality capability for the SED is compared to the native form/format of the content to determine whether the native form/format already satisfies the best quality of content characteristics. If so, then processing returns to a calling process to perform other actions. If however, the native form/format does not satisfy the best quality of content characteristics, processing flows to decision block 508.

At decision block 508, a determination is made whether the content can be transcoded to the best quality for the SED. That is, each of the native form/format characteristics is compared to the best quality content characteristics, and transcoded to attempt to match the best quality for the SED. That is, for example, resolutions, compressions, color schemes, and the like, may each be examined and, as appropriate, transcoded such that the content characteristics are attempted to match the best quality for the SED.

Processing flows next to decision block 512, where a determination is made whether during block 510 has one or more content characteristics exceeded the minimum or maximum quality set of content characteristics limits for the SED. This may arise for example, where there is an interdependency between two or more content characteristics. Thus, for example, when a compression mode is selected that attempts to obtain a best quality for compression for the content, a content size, resolution, aspect, or other characteristic of the content might also be modified. As such, each of the characteristics may be examined to determine if one or more have exceeded the SED's limits. If so, processing flows to block 518; otherwise, processing continues to decision block 514.

At decision block the one or more content characteristics that is outside of the minimum/maximum limits for the SED, may be reset to the exceeded limit value. It is recognized that such tuning of content characteristics might again perturb yet another content characteristic. Thus, at block 518, tuning to ensure that each content characteristic is within the SED's limits might be an interactive process. Thus, processing flows to decision block 514.

At decision block 514, a determination is made whether the content is optimized for the SED, or whether to continue to seek to optimize the content's characteristics a close as practicable towards a best quality for the SED. Such determination is obviously complex, and may involve an analysis of a number of iterations attempted, whether the iterations have reached a level off or plateau in tuning, or the like. For example, process 500 might change one content characteristic, which in turn changes another content characteristic, in which the process might loop back to correct the inadvertently changed content characteristic, and thus repeat itself with little improvement. Thus, such events are examined for, as well as related types of events, such as where an asymptote might be reached for tuning a characteristic, but the best quality not quite reached for that characteristic. When such tuning events are detected, process 500 may then select to determine that the content has been optimized given such events, and constraints, or the like, and select to return to the calling process. If however, a determination is made that another attempt towards optimizing the transcoding of the content is to be performed, processing then loops back to block 510. Thus, in some embodiment, the transcoding of the content may be sub-optimal for a given SED. However, in each instance the content is transcoded to be within at least the limits for the capability of the SED. Should at decision block 514, however, it be determined that no solution exists that enables the content to be transcoded and remain within the limits for the SED, an error message might be generated, and the process may still exist at block 514. In which instance, process 400 might send an error message to the SED indicating that the content might be unavailable for the SED.

Moreover, at block 510, if one of the other sets of content characteristics is satisfied, either by blending and/or transcoding, then that other set of content characteristics is used. Thus, while the content might still be playable for the SED, it might not be using a best playback quality for which the SED is capable of. For example, it might result from process 500 that the content is either already, say a minimum set of content characteristics for the SED, or can/is transcoded to the minimum set of content characteristics. As such, this lowest playback quality for the content is still playable by the SED. It simply might no longer be termed 'the best' playback quality.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative Embodiment of a SED Capability Set

Figure 6:
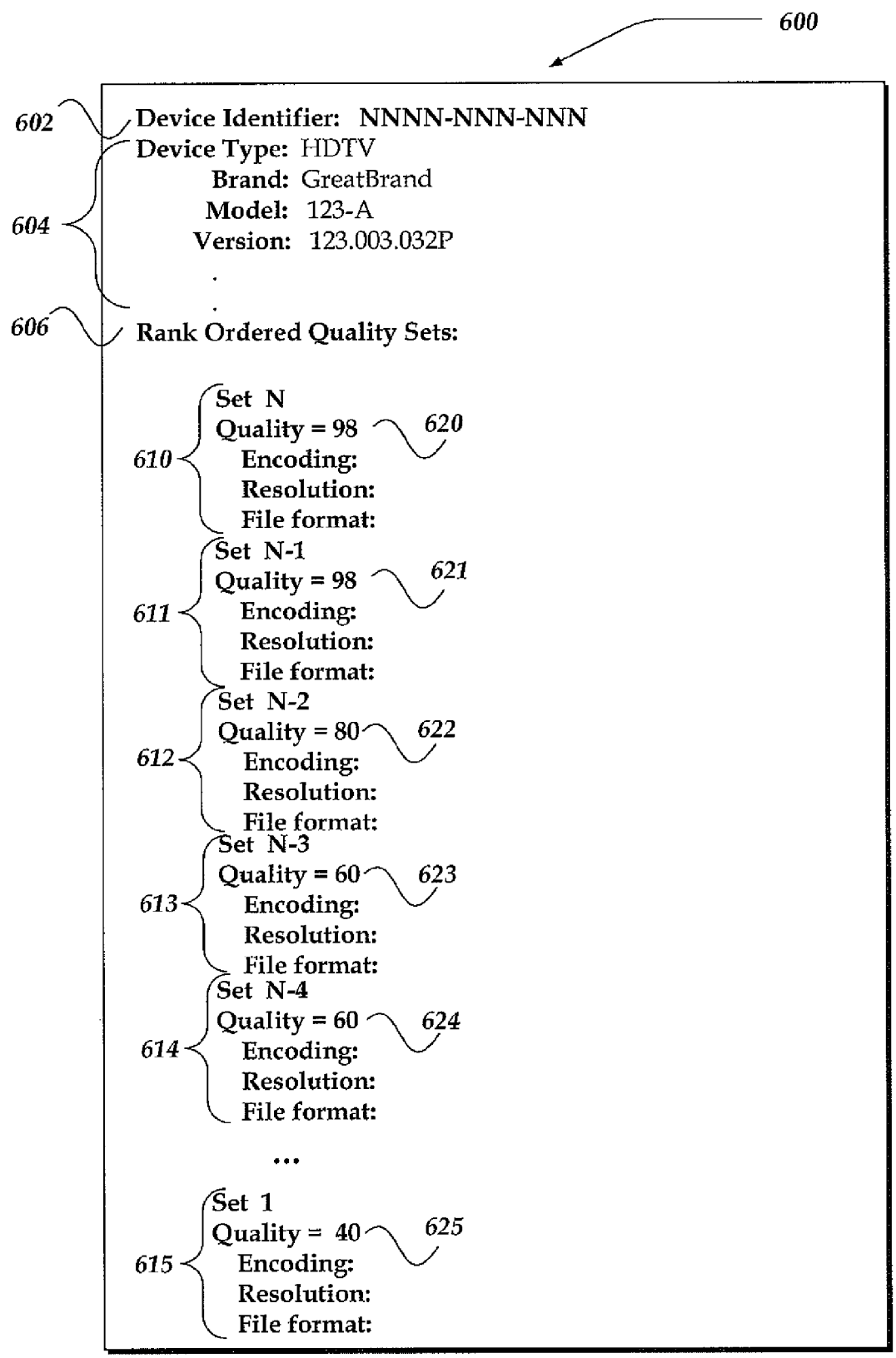
FIG. 6 illustrates one embodiment of a non-exhaustive example of a set of SED capabilities that includes sets of content characteristics, shown in a monotonically decreasing rank ordering by quality for the SED to provide content for playback.

FIG. 6 illustrates one embodiment of a non-exhaustive example of a SED capability set. Capability set 600 may include many more or less components than those shown. The components shown, however, are sufficient to disclose an illustrative embodiment for practicing the invention. Capability set 600 may, for example, be provided by one or more of SEDs 101-104 of FIG. 1, and/or through a SED provider 110 of FIG. 1.

Capability set 600 may take any of a variety of forms and/or formats. As such, it should be clear that capability set 600 provides one possible configuration useable for providing a set of capabilities for a particular SED. Capability set 600 may, for example, use existing formats such as those used by mobile devices in describing a user agent profile. For example, capability set 600 may take a form similar to that defined by the User Agent Profile Specification available from the Wireless Application Protocol Forum, Ltd. Another example format for capability set 600 may take advantage of the structure defined by Composite Capability/Preference Profiles (CC/PP), defined by the World Wide Web Consortium. Further examples of formats that may be employed include a mobile information device profile (MIDP), a wireless universal resource file (WURFL), and the like. Because such formats typically describe attributes of a mobile device, such as a screen size, screen resolution, memory size for a given device, and the like, the formats may be readily modified for use in transmitting capability set 600. Moreover, many industry standards bodies, original equipment manufacturers, and the like, may already be configured to manage and/or use such structures.

However, capability set 600 is not restricted to using these formats, and clearly others may also be used. For example, many such formats may merely include a single capability or configuration of a device. However, capability set 600 provides one or more quality characteristic sets 610-615 of which at least one is definable as a maximum quality set and at least one other is definable as a minimum quality set.

Capability set 600 may also include a variety of other information besides content characteristic sets 606. For example, capability set 600 may include a unique device identifier 602 that is configured to enable SPS 109 of FIG. 1 to determine whether a device is serviceable and/or otherwise authorized for content transcoding. Capability set 600 may also include device information 604 that may include a device type, manufacturer information, model number, version information, and/or other device information.

As discussed above, in one embodiment, a SED might merely provide device identifier 602 during a request for content. The device identifier 602 may then be used by SPS 109 to locate capability set 600 that may have been received from the SED during registration, or even from a SED provider 110 of FIG. 1. Moreover, capability set 600 may be provided over a network in a condensed set, a split set (e.g., each capability subset 607-609 sent separately), or any of a variety of other approaches. In one embodiment, at least some of capability set 600 might be sent encrypted, however, in another embodiment; capability set 600 may also be communicated over the network in the clear—unencrypted.

It should also be noted that capability set 600 is directed towards a defined set of characteristics for content. Therefore, in one embodiment, capability set 600 may not include every possible characteristic of content. However, in one embodiment, capability set 600 may instead identify a subset of content characteristics for which transcoding may be directed. However, in another embodiment, capability set 600 may include virtually every characteristic of content identified as affecting play quality at a SED.

In any event, shown in FIG. 6 is a plurality of content characteristic sets 610-615. Content characteristic sets 610-615 are shown to be rank ordered 606 based on a determined quality level or value. Such quality level or value may be provided by a SED provider 110 of FIG. 1, based on a variety of tests, engineering judgment, or the like. The quality levels may range from a worst or lowest value to a maximum possible value. In one embodiment, such value range might be from zero to 100, respectively. However, the invention is not so limited, and another value range might be used. Moreover, the value range might be represented by an alpha rating range, without departing from the scope of the invention.

In any set of content characteristics for a given SED, the quality values need not be equal to the possible value range. Thus, as can be seen in the non-exhaustive example of FIG. 6, content characteristic sets 610-615 have quality values 620-625, which range from a maximum quality value of 98 (see quality value 620 of FIG. 6) to a minimum quality value of 40 (see quality value 625 of FIG. 6). Moreover, as further illustrated, capability set 600 shows that for this SED multiple content characteristic sets may have a same quality value. For example, content characteristic sets 610-611 each have a quality value of 98, while content characteristic sets 613-614 each have a quality value of 60. Such need not always be the case, however. It is shown here, merely, to illustrate one possible configuration. As such, this non-exhaustive example is not to be construed to limit the invention, and other values are also possible.

In any event, as shown in FIG. 6, a selection of a quality content characteristic set might occur from any one of sets 610-611, where, content characteristic sets 610-611 are also considered to be the maximum sets. If content is received that falls outside of ranges of maximum content characteristic sets 610-611, or minimum content characteristic set (set 615), then transcoding may reset the values of the content characteristic to within these ranges.

As illustrated, a selection of a best set then might look to whether the content satisfies first one of content characteristic sets 610 or 611. If so, then the best quality set is identified, and therefore used (see block 506 of FIG. 5). If the content can be transcoded to one of these best quality sets, it is then transcoded, as described above at block 516 of FIG. 5. Otherwise, the rank ordered set in progressively searched to find a next best quality set that the content may be transcoded to within the provided content characteristic sets, or otherwise satisfies without transcoding, while remaining within the minimum/maximum content characteristic sets.

While FIG. 6 illustrates sets of capabilities for a given set of content characteristics that have been rank ordered, the invention is not so limited. Thus, in another embodiment, each content characteristic for a given SED may also be individually rank ordered. For example, in another embodiment, supported format content characteristics might be rank ordered independent from compression content characteristics. Similarly, the compression content characteristics may be rank ordered distinct from resolution content characteristics, and so forth. Each of the rank ordered content characteristics may have separate quality values, with a defined maximum and minimum for a given content characteristic. Thus, the invention is not to be construed and being narrowed to the non-exhaustive example illustrated in FIG. 6, and other ordering and/or grouping of characteristics may also be performed, without departing from the scope of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for use in managing delivery of content over a network, comprising:
   receiving a request for content;
   receiving a unique device identifier associated with a consumer electronic device;
   receiving a set of capabilities for the consumer electronic device, wherein the set of capabilities includes at least a minimum content characteristic set, a maximum content characteristic set, and at least one other content characteristic set for a defined best set of capabilities for which the consumer electronic device is configured to play content, each content characteristic set having a plurality of characteristics about the content;
   comparing a plurality of native format characteristics of the requested content to the best set of capabilities;
   iteratively transcoding, based on a result of the comparing, at least one content characteristic of the requested content as defined within the set of capabilities towards one of the identified set of content characteristics such that each of the content characteristics for the requested content is at or between minimum and maximum limits for each content characteristic as identified in the minimum content characteristic set and the maximum content characteristic set, respectively; and
   providing the transcoded content over the network to the consumer electronic device.

2. The method of claim 1, wherein providing the transcoded content further includes providing at least one advertisement with the transcoded content.

3. The method of claim 1, wherein iteratively transcoding the at least one content characteristic further comprises terminating the iterations when a defined event is detected, or a defined number of iterations are detected.

4. The method of claim 1, wherein iteratively transcoding the at least one characteristic further comprises setting a content characteristic within the defined set of content characteristics to a minimum or maximum limit if the content characteristic is detected to be outside of one of the limits.

5. The method of claim 1, further comprising:
   determining if the unique device identifier is valid for the consumer electronic device; and further determining if a user account identifier associated with the request is authorized to receive the requested content.

6. The method of claim 1, wherein iteratively transcoding the at least one characteristic of the requested content is performed by a switch proxy service component that is interposed between a content provider and the consumer electronic device.

7. The method of claim 1, wherein transcoding a first characteristic of the content causes a second characteristic of the content to exceed one of the minimum or maximum limits.

8. A network device for managing delivery of content over a network, comprising:
   a transceiver to send and receive data over the network; and
   a processor that is operative to perform actions, including:
      receiving a request for content, wherein the request is associated with a unique device identifier of a consumer electronic device, for which the content is to be provided;
      receiving a set of device capabilities for the consumer electronic device, wherein the set of capabilities includes a rank ordering by quality level of a plurality of sets of content characteristics playable by the consumer electronic device, the plurality of sets including at least a minimum quality set, a maximum quality set, and at least one other set of content characteristics for a defined best set of capabilities, each content characteristic set having a plurality of characteristics about the content;
      comparing a plurality of native format characteristics of the requested content to the best set of capabilities;
      iteratively transcoding, based on a result of the comparing, at least one content characteristic of the requested content that is identified within the set of capabilities towards one of the sets of content characteristics, and constraining each defined content characteristic within the requested content at or within minimum and maximum limits defined by the minimum and maximum sets of content characteristics; and
      providing the transcoded content over the network to the consumer electronic device.

9. The network device of claim 8, wherein iteratively transcoding further comprising, terminating the transcoding if each of the content characteristic identified within the set of capabilities are consistent with at least one of the sets of content characteristics.

10. The network device of claim 8, wherein providing the transcoded content further comprises providing at least advertisement with the transcoded content to the consumer electronic device.

11. The network device of claim 8, wherein the processor is operative to perform actions, further including:
   determining if the unique device identifier is valid, and if it is not valid, inhibiting providing the transcoded content to the consumer electronic device.

12. The network device of claim 8, wherein the processor is operative to perform actions, further including:
   determining if a user associated with the consumer electronic device is authorized to receive the content, and if not, then inhibiting providing of the transcoded content to the consumer electronic device.

13. The network device of claim 8, wherein the request for the content is received from another network device other than the consumer electronic device.

14. The network device of claim 8, wherein the network device is configured to provide a user interface for use in requesting the content.

15. A system for use in managing delivery of content over a network, comprising:
   a consumer electronic device that is configured and arranged to perform actions, including:
      sending a device identifier over the network, wherein the device identifier is unique to the consumer electronic device;
      providing over the network a set of capabilities for the consumer electronic device, wherein the set of capabilities includes a plurality of different sets of content characteristics for a defined set of characteristics of content, wherein the plurality includes at least a minimum and a maximum set of content characteristics and one other set of content characteristics for a defined best set of capabilities; and
      providing a request for content over the network; and
   a switch proxy service component that is configured and arranged to perform actions, including:
      receiving the request for content;
      receiving the unique device identifier, and determining based on the unique device identifier if the consumer electronic device is valid for receiving the requested content;
      if the consumer electronic device is valid, comparing a plurality of native format characteristics of the requested content to the best set of capabilities;
      if the consumer electronic device is valid, iteratively transcoding, based on a result of the comparing, at least one content characteristic of the requested content identified within the set of capabilities towards one of the plurality of sets of content characteristics, while constraining each defined content characteristic within the requested content at or between minimum and maximum limits defined by the minimum and maximum sets of content characteristics; and
      providing the transcoded content over the network to the consumer electronic device.

16. The system of claim 15, wherein while maintaining each content characteristic within the requested content further comprises, if a content characteristic within the requested content is determined to be outside of the limits, resetting the content characteristic to the exceeded limit.

17. The system of claim 15, wherein the switch proxy service component is configured and arranged to perform actions, further including:
   providing at least one advertisement with the provided transcoded content to the consumer electronic device.

18. A non-transitory computer-readable storage medium configured to store data and instructions thereon, wherein the execution of the instructions on computing device enable the computing device to perform actions for managing content delivery over a network, comprising:
   receiving a set of device capabilities for a consumer electronic device, wherein the set of capabilities includes a rank ordered listing of a plurality of sets of content characteristics for content playable by the consumer electronic device, the rank ordered listing including at least a minimum and a maximum set of content characteristics and at least one other set of content characteristics for a defined best set of capabilities, wherein the minimum set includes minimum limits for each content characteristic identified in the set, and the maximum set includes maximum limits for each content characteristic identified in the set, each content characteristic set having a plurality of characteristics about the content;

receiving a request for content to be accessed by the consumer electronic device;

comparing a plurality of native format characteristics of the requested content to the best set of capabilities iteratively transcoding, based on a result of the comparing, at least one characteristic of the requested content that is identified within the defined set of capabilities towards one of the sets of content characteristics, and maintaining each defined content characteristic within the requested content at or between the minimum and maximum limits defined within the minimum set of content characteristics and the maximum set of content characteristics, respectively; and providing the transcoded content over the network to the consumer electronic device.

19. The computer-readable storage medium of claim 18, wherein the computing device performs actions further comprising:

receiving at least one of a unique device identifier associated with the consumer electronic device or a user account identifier; and based on the received at least one, determining if the request for content is valid and authorized.

20. The computer-readable storage medium of claim 18, wherein the requested content is received from a content provider and iteratively transcoded, and stored in a data store, prior to receiving the request for the content.

21. The computer-readable storage medium of claim 18, wherein the rank ordered listing includes the plurality of sets of content characteristics being monotonically rank ordered by a quality value associated with each respective set of defined content characteristics in the plurality.

* * * * *

UNITED STATES PATENT AND TRADEMARK OFFICE
CERTIFICATE OF CORRECTION

| | | |
|---|---|---|
| PATENT NO. | : 8,301,784 B2 | Page 1 of 1 |
| APPLICATION NO. | : 12/191147 | |
| DATED | : October 30, 2012 | |
| INVENTOR(S) | : Ady Hascalovici et al. | |

It is certified that error appears in the above-identified patent and that said Letters Patent is hereby corrected as shown below:

On Sheet 5 of 6, Box 502, Figure 5, line 2, delete "Capabilties" and insert -- Capabilities --, therefor.

In column 1, line 35, delete "quality" and insert -- quality. --, therefor.

In column 3, line 16, delete ""a,"$^1$" and insert -- "a," --, therefor.

In column 3, line 51, delete "Wavform" and insert -- Waveform --, therefor.

In column 4, line 49, delete "'maximum" and insert -- maximum --, therefor.

In column 5, line 65, delete "SF-D" and insert -- SED --, therefor.

In column 6, line 8, delete "SFDs" and insert -- SEDs --, therefor.

In column 6, line 40, delete "(SMGL)," and insert -- (SGML), --, therefor.

In column 12, line 51, delete "embodiment" and insert -- embodiment, --, therefor.

In column 14, line 66, delete "clear.'Content" and insert -- clear.' Content --, therefor.

In column 17, line 38, delete "real-time," and insert -- real-time. --, therefor.

Signed and Sealed this
Fifth Day of February, 2013

Teresa Stanek Rea
*Acting Director of the United States Patent and Trademark Office*